US008089981B2

(12) United States Patent
Hiraki

(10) Patent No.: US 8,089,981 B2
(45) Date of Patent: Jan. 3, 2012

(54) METHOD OF RESOLVING DUPLICATE MAC ADDRESSES, NETWORK DEVICE MANAGEMENT SYSTEM, SERVER, AND INFORMATION DEVICE

(75) Inventor: Tatsushi Hiraki, Osaka (JP)

(73) Assignee: Panasonic Corporation, Osaka ( * ) Notice: Subject to any disclaimer, the term of this patent is extended or adjusted under 35 U.S.C. 154(b) by 182 days.

(21) Appl. No.: 12/375,123

(22) PCT Filed: Jun. 12, 2008

(86) PCT No.: PCT/JP2008/001498
§ 371 (c)(1),
(2), (4) Date: Jan. 26, 2009

(87) PCT Pub. No.: WO2008/152807
PCT Pub. Date: Dec. 18, 2008

(65) Prior Publication Data
US 2009/0265455 A1     Oct. 22, 2009

(30) Foreign Application Priority Data

Jun. 13, 2007 (JP) .................................. 2007-156016

(51) Int. Cl.
*H04L 12/28* (2006.01)
*H04L 12/413* (2006.01)
(52) U.S. Cl. ................... 370/445; 370/390; 370/395.1
(58) Field of Classification Search .................. 370/352, 370/354, 392, 395.3, 407, 410, 390, 241, 370/242; 725/111, 115; 709/245, 220, 224
See application file for complete search history.

(56) References Cited

U.S. PATENT DOCUMENTS

| 7,272,846 B2 * | 9/2007 | Williams et al. ............... 725/111 |
| 7,433,356 B2 * | 10/2008 | Jain et al. ..................... 370/392 |
| 7,444,405 B2 * | 10/2008 | Gangadharan ................ 709/226 |
| 7,529,851 B1 * | 5/2009 | Haley et al. .................... 709/245 |
| 7,633,855 B2 * | 12/2009 | Singh et al. .................... 370/216 |
| 7,706,258 B2 * | 4/2010 | Elie-Dit-Cosaque et al. 370/224 |
| 2004/0123329 A1 * | 6/2004 | Williams et al. ............... 725/111 |
| 2005/0044273 A1 * | 2/2005 | Bouchat et al. ................ 709/245 |
| 2005/0207447 A1 * | 9/2005 | Sekiguchi et al. ............. 370/475 |

FOREIGN PATENT DOCUMENTS

| JP | 11-074915 A | 3/1999 |
| JP | 11-249989 A | 9/1999 |
| JP | 2004-048175 A | 2/2004 |
| JP | 2004-088392 A | 3/2004 |
| JP | 2004-120213 A | 4/2004 |
| JP | 2006-512877 A | 4/2006 |
| JP | 2006-197516 A | 7/2006 |
| WO | 2005-008994 A1 | 1/2005 |

OTHER PUBLICATIONS

Japanese Search Report for PCT/JP2008/001498.

* cited by examiner

*Primary Examiner* — Hanh Nguyen
(74) *Attorney, Agent, or Firm* — Pearne & Gordon LLP

(57) ABSTRACT

MAC addresses of information devices on a network are collected using a broadcast frame or multicast frame of Ethernet®. If duplicate MAC addresses are detected, an Ethernet® frame, including a device identifier of information device and a MAC address to be set, is sent by broadcast transmission or multicast transmission. The information devices receiving this Ethernet® frame compare the above device identifier with their own device identifiers. If they match, the MAC address is changed to that designated. Duplicate MAC addresses are thus resolved, enabling correct Ethernet® communications.

13 Claims, 8 Drawing Sheets

FIG. 4

| Destination Address 6 bytes | Source Address 6 bytes | Layer 2:Data Link (MAC) length 2 bytes | Payload (46 to 1500 bytes) | Frame Check Sequence 4 bytes |
|---|---|---|---|---|
| FF.FF.FF.FF.FF.FF | MAC address of server | 1500 max | Including MAC request code | Frame Check Sequence |

FIG. 5

| Destination Address 6 bytes | Source Address 6 bytes | Layer 2:Data Link (MAC) length 2 bytes | Payload (46 to 1500 bytes) | Frame Check Sequence 4 bytes |
|---|---|---|---|---|
| Source address of MAC request frame received | MAC address of information device | 1500 max | Including MAC information code and its device identifier (e.g., serial number) | Frame Check Sequence |

FIG. 6

| Destination Address 6 bytes | Source Address 6 bytes | Layer 2:Data Link (MAC) length 2 bytes | Payload (46 to 1500 bytes) | Frame Check Sequence 4 bytes |
|---|---|---|---|---|
| FF.FF.FF.FF.FF.FF | MAC address of server | 1500 max | Including MAC setting code, MAC address to be set, device identifier | Frame Check Sequence |

METHOD OF RESOLVING DUPLICATE MAC ADDRESSES, NETWORK DEVICE MANAGEMENT SYSTEM, SERVER, AND INFORMATION DEVICE

This application is a U.S. National Phase Application of PCT International Application PCT/JP2008/001498.

TECHNICAL FIELD

The present invention relates to methods of resolving duplicate MAC addresses of multiple information devices connected by Ethernet®, network device management systems, servers, and information devices.

BACKGROUND ART

When Ethernet® is used for communications, a MAC address (Media Access Control address) is employed as an address that is unique to each piece of hardware. In OSI (Open Systems Interconnection) reference models, the MAC address is an address in layer 2. The MAC address is also called the physical address, Ethernet® address, or Node ID.

A MAC address is 48-bit data. The IEEE manages the upper 24 bits of the MAC address, and these bits are called the OUI (Organizationally Unique Identifier). Manufacturers can assign their own values to the lower 24 bits. This system thus provides a unique MAC address on the network.

In the management of MAC addresses, a unique MAC address is embedded in a non-volatile memory such as an EEPROM (electrically erasable and programmable read-only memory) during manufacturing. To reduce the aforementioned burden of managing MAC addresses (management of uniqueness) during manufacturing, an IC containing unique information, such as a silicon serial number, may be used.

However, if the IC containing silicon serial number is used for managing MAC addresses, the same MAC address may be present in the network if the amount of information is reduced or processed. For example, this may happen when a 6-byte silicon serial number is processed to a 3-byte information to generate a MAC address.

If two or more devices in a network have the same MAC address, an Ethernet® frame sent by unicast transmission will not reach its intended destination, and communications, including TCP/IP, may not operate correctly.

On the other hand, the MAC address can be changed in some devices. This is disclosed in Patent Document 1. In this example, the MAC address to be set is searched for in the network before changing it.

If the MAC address does not exist in the network, a set request packet of SNMPv3 (Simple Network Management Protocol version 3) is generated and sent. The MAC address is then written to the non-volatile memory of the device receiving this packet. This device will then use this MAC address thereafter. SNMPv3 uses UDP (User Datagram Protocol) packets.

The method disclosed in Patent Document 1 is a system designed to change the MAC address of a specific device so as to rule out duplicate MAC addresses in a network where no duplicate MAC addresses exist. Since this system employs SNMPv3 as the communication means, communication itself cannot be correctly established in the first place if duplicate MAC addresses are present in the network. Therefore, duplication of MAC addresses cannot be resolved.

Patent Document 1: Japanese Patent Unexamined Publication No. 2006-197516.

SUMMARY OF THE INVENTION

A method of resolving duplicate MAC addresses of the present invention is a method of resolving duplicate MAC addresses in a network configured with a server managing MAC addresses and multiple information devices. The server distributes a MAC request frame that requests for a MAC address of each of information devices on the network, and collects a MAC information frame containing device identifier of information device returned from each of the information devices. If any of MAC addresses in collected MAC information frames are the same, the server distributes to the network a MAC setting frame containing device identifiers of information devices whose MAC addresses are the same and new MAC addresses. The information devices whose MAC addresses are the same then change their MAC addresses to new MAC addresses. This rapidly resolves duplicate MAC addresses even if information devices have the same MAC address on the network, ensuring correct communications environment.

A network equipment management system of the present invention prevents duplicate MAC addresses of information devices on a network in which multiple information devices and a server for managing MAC addresses of information devices are networked. The server includes a MAC request frame generator for requesting a MAC address of each of multiple information devices, a received frame analyzer for extracting MAC information & device identifier of each information device from a MAC information frame received from each information device, MAC information & device identifier retention unit for retaining a set of MAC information and device identifier of information device, a duplication detector for searching information retained in the MAC information & device identifier retention unit, and detecting duplicate MAC information; and a MAC setting frame generator for generating a MAC setting frame based on a detection result of the duplication detector. Each information device includes a MAC information & device identifier retention unit for retaining a set of its MAC information and its device identifier; a received frame analyzer for extracting MAC information and device identifier from a MAC setting frame received from the server; a MAC information update unit for updating its MAC information using MAC information obtained from the MAC information analyzer if the device identifier obtained from the received frame analyzer and the device identifier obtained from the MAC information & device identifier retention unit match upon comparison; and a MAC information frame generator for obtaining a set of its MAC information and device identifier from the MAC information & device identifier retention unit, and generating the MAC information frame.

The server of the present invention is connected to multiple information devices by the network, and manages MAC addresses of information devices. The server includes a MAC request frame generator for requesting a MAC address that each of multiple information devices possesses; a received frame analyzer for extracting MAC information and unique identifier of each information device in the MAC information frame received from each information device; a MAC information & device identifier retention unit for retaining a set of MAC information and device identifier; a duplication detector for searching information held in the MAC information & device identifier retention unit, and detecting duplicate MAC information; and a MAC setting frame generator for generating a MAC setting frame based on a detection result of the duplication detector.

An information device of the present invention is connected to a server that manages MAC addresses of devices on the network. The information device includes a MAC information & device identifier retention unit that retains sets of its MAC information and its unique identifier; a received frame analyzer for extracting MAC information and device identifier in a MAC setting frame received from the server; a MAC information update unit for comparing the device identifier obtained from the received frame analyzer and the device identifier obtained from the MAC information & device identifier retention unit, and updating its MAC information using MAC information obtained from the MAC information analyzer if the compared device identifiers match; and a MAC information frame generator for obtaining a set of its MAC information and device identifier from the MAC information & device identifier retention unit and generating a MAC information frame.

BRIEF DESCRIPTION OF DRAWINGS

FIG. 4 is an example of a MAC request frame in accordance with the preferred embodiment.

FIG. 5 is an example of a MAC information frame in accordance with the preferred embodiment.

FIG. 6 is an example of a MAC setting frame in accordance with the preferred embodiment.

REFERENCE MARKS IN THE DRAWINGS

Figure 1:
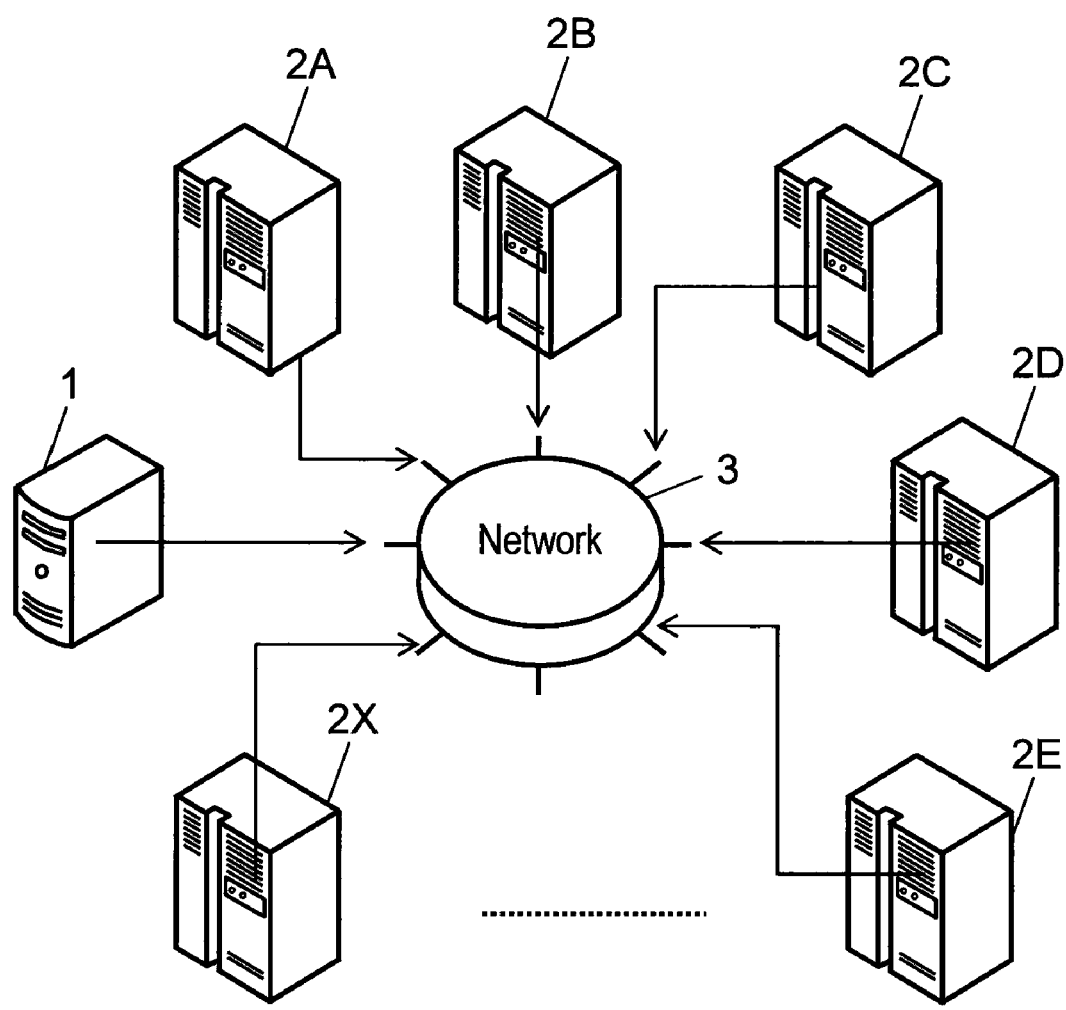
FIG. 1 is an example of configuration of a network in accordance with a preferred embodiment of the present invention.

1 Server
2, 2A-2X Information device (Client)
3 Network
201, 301 Communication unit
202 MAC request frame generator
203, 302 Received frame analyzer
204, 304 MAC information & device identifier retention unit
205 Duplication detector
206 MAC setting frame generator
303 MAC information update unit
305 MAC information frame generator

DETAILED DESCRIPTION OF PREFERRED EMBODIMENTS

A preferred embodiment of the present invention is described below with reference to drawings.

Preferred Embodiment

First, a method of resolving duplicate MAC addresses is described with reference to FIGS. 1 and 2. FIG. 1 is an example of the configuration of network 3 in the preferred embodiment of the present invention. FIG. 1 illustrates the state in which one server 1 and multiple information devices (hereafter also referred to as "clients") 2A to 2X are connected to network 3. Information devices 2A to 2X may be simply called information device 2 when differentiation is not needed.

Star topology is generally adopted, and in this structure, server 1 and information devices 2 are connected to a switching hub (not illustrated) that executes switching operations based on MAC addresses.

Server 1 in network 3 is not limited to one unit. A server function and client function, which are described later, may co-exist in one information device 2.

Figure 2:
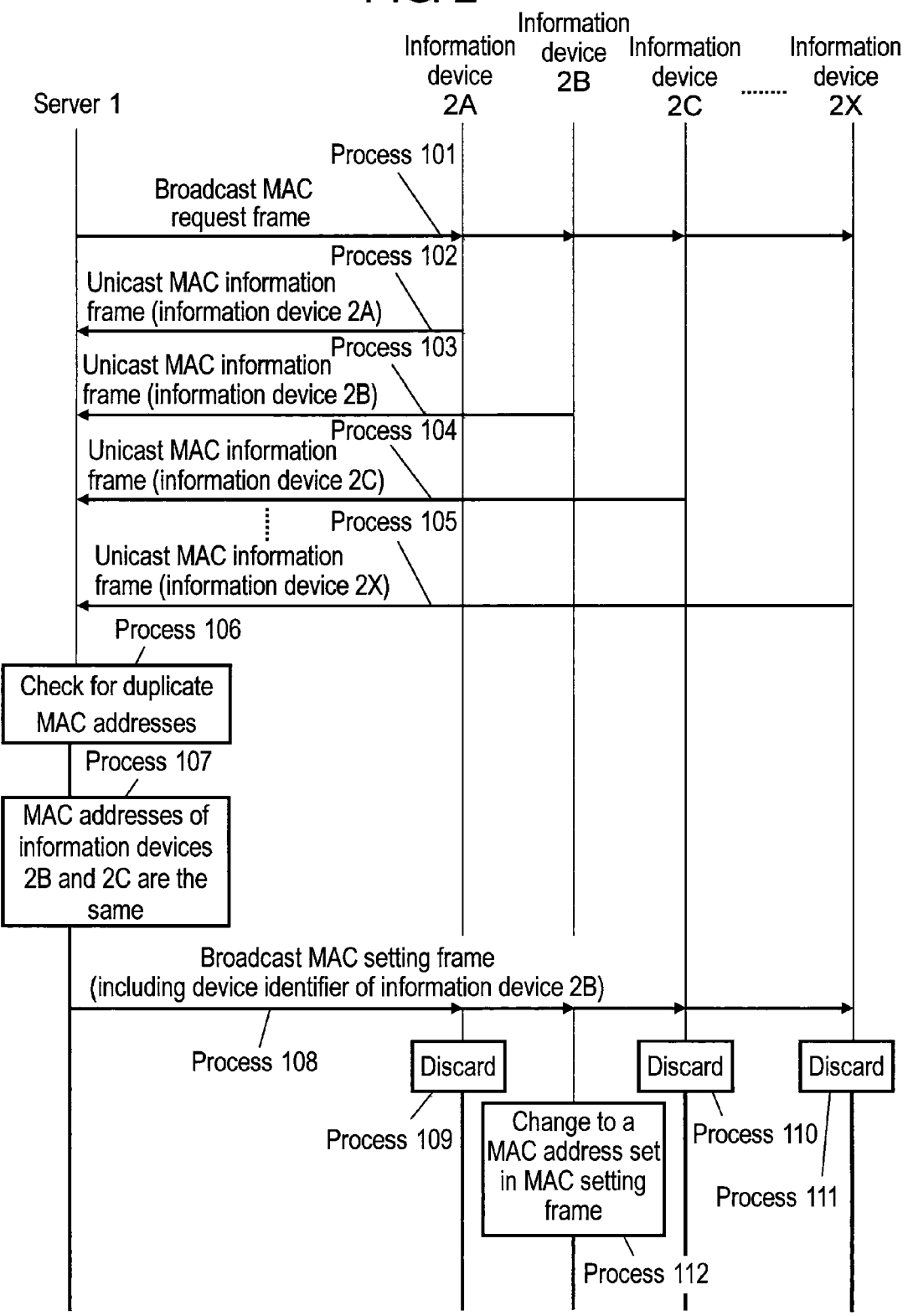
FIG. 2 illustrates an outline of a method of resolving duplicate MAC addresses in accordance with the preferred embodiment.

FIG. 2 shows an outline of the method of resolving duplicate MAC addresses in the preferred embodiment of the present invention. In process 101, server 1 distributes a MAC request frame to all information devices 2 so as to collect MAC address information of information devices 2 connected to network 3. In this case, the MAC request frame is sent to a destination MAC address of FF-FF-FF-FF-FF-FF by broadcast transmission. Alternatively, a multicast address (e.g., 01-80-C2-00-00-F0) may be used as a destination MAC address.

In processes 102 to 105, all information devices 2 receiving the MAC request frame return a MAC information frame to server 1, a distribution source. The MAC information frame contains its own device identifier as described later.

In process 102, information device 2A sends the MAC information frame to server 1 by unicast transmission. Also in processes 103 to 105, information devices 2B to 2X send their MAC information frames to server 1.

In these processes 102 to 105, a destination MAC address of MAC information frame is the MAC address of a distribution source (server 1) of MAC request frame, and the MAC information frame is returned by unicast transmission. However, although not illustrated, if the MAC address of server 1 and a MAC address of any of information devices 2 are possibly be the same, the aforementioned broadcast address or multicast address may be used as a destination MAC address to which the MAC information frame is sent.

Next, in process 106, server 1 receiving MAC information frames collects information and checks for the presence of duplicate MAC addresses. In an example shown in FIG. 2, the MAC address of information device 2B and the MAC address of information device 2C are assumed to be the same.

In process 107, server 1 detects that the MAC address of information device 2B and that of information device 2C are the same. If no duplicate MAC addresses are detected, server 1 skips the subsequent processes (not illustrated).

In process 108, server 1 sends a MAC setting frame that will change the MAC address of information device 2B by broadcast transmission. In this case, the destination MAC address of the MAC setting frame is the aforementioned broadcast address or multicast address. The MAC setting frame contains a device identifier that information device 2B possess, as described later.

Next, in processes 109 to 111, information devices 2 receiving the MAC setting frame compare their own device identifier and the device identifier designated in the MAC setting frame. If these device identifiers do not match, the frame is discarded.

In process 112, information device 2B changes its MAC address because the device identifier of information device 2B and the device identifier designated in the MAC setting frame match. More specifically, information device 2B stores the MAC address designated in the MAC setting frame in a memory, such as EEPROM or FLASH, and this MAC address is used for communications thereafter.

Although not illustrated, if multiple pairs of information devices 2 have the same MAC address, or three or more information devices 2 have the same MAC address, server 1 sends the MAC setting frame multiple times so as to change the MAC addresses of all applicable information devices 2 until all duplicate MAC addresses are cleared.

Next, details of the method of resolving duplicate MAC addresses are described with reference to FIGS. 3 to 10.

Figure 3:
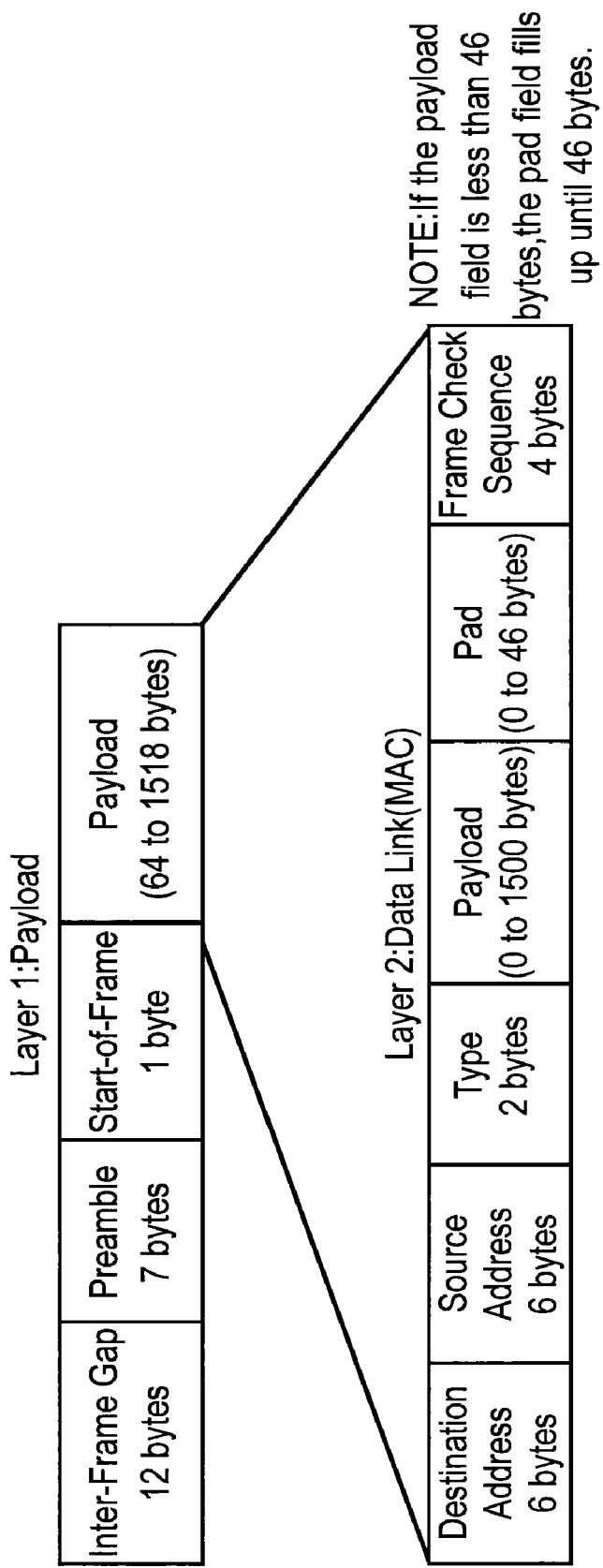
FIG. 3 illustrates a frame structure used in an Ethernet® interface in accordance with the preferred embodiment.

FIG. 3 illustrates a frame structure used in an Ethernet® interface in the preferred embodiment of the present invention. Each piece of data in the frame is specified in IEEE802.3.

FIG. 4 illustrates an example of the MAC request frame in the preferred embodiment of the present invention. This frame is sent from server 1 to information devices 2 so as to collect MAC information frames. The destination address is a broadcast address (FF-FF-FF-FF-FF-FF) or multicast address (e.g., 01-80-C2-00-00-F0), although not illustrated. The source address is the MAC address of server 1 that is transmitting the frame. Information (command code) for identifying the MAC request frame is included in the payload.

FIG. 5 is an example of a MAC information frame in the preferred embodiment of the present invention. This frame is returned from each of information devices 2 to server 1 as a response to the MAC request frame in FIG. 4. The destination address is the source address (MAC address of server 1) of the MAC request frame received in advance. Alternatively, the broadcast address (FF-FF-FF-FF-FF-FF) or multicast address (e.g., 01-80-C2-00-00-F0) is applicable (not illustrated).

The source address is the MAC address of the information device transmitting this frame. Information (command code) for identifying the MAC information frame and device identifier are included in the payload. The device identifier is one or more of the serial number, information that identifies the type of information device (e.g., lighting controller, video equipment, and audio output equipment), part number, and manufacturing date code. Each of multiple information devices 2 on the network can be identified by combining one or more of the device identifiers contained in the MAC request frame. The device identifier is not limited to the aforementioned pieces of information. Any other piece of information is acceptable as long as the target information device can be uniquely identified.

FIG. 6 is an example of a MAC setting frame in the preferred embodiment of the present invention. This frame is sent from server 1 to a specific information device (information device 2 with the same MAC address) so as to change its MAC address.

The destination address is a broadcast address (FF-FF-FF-FF-FF-FF) or a multicast address (e.g., 01-80-C2-00-00-F0), although not illustrated.

The source address is the MAC address of server 1 that is transmitting this frame. The payload includes information (command code) for identifying the MAC setting frame, a new MAC address to be set, and the device identifier held by the information device that identifies it.

The device identifier of information device 2 includes one or more of device identifiers obtained from the aforementioned MAC information frame. In addition, although not illustrated, multiple sets of a new MAC address and device identifier of information device 2 may be stored in the frame.

Figure 7:
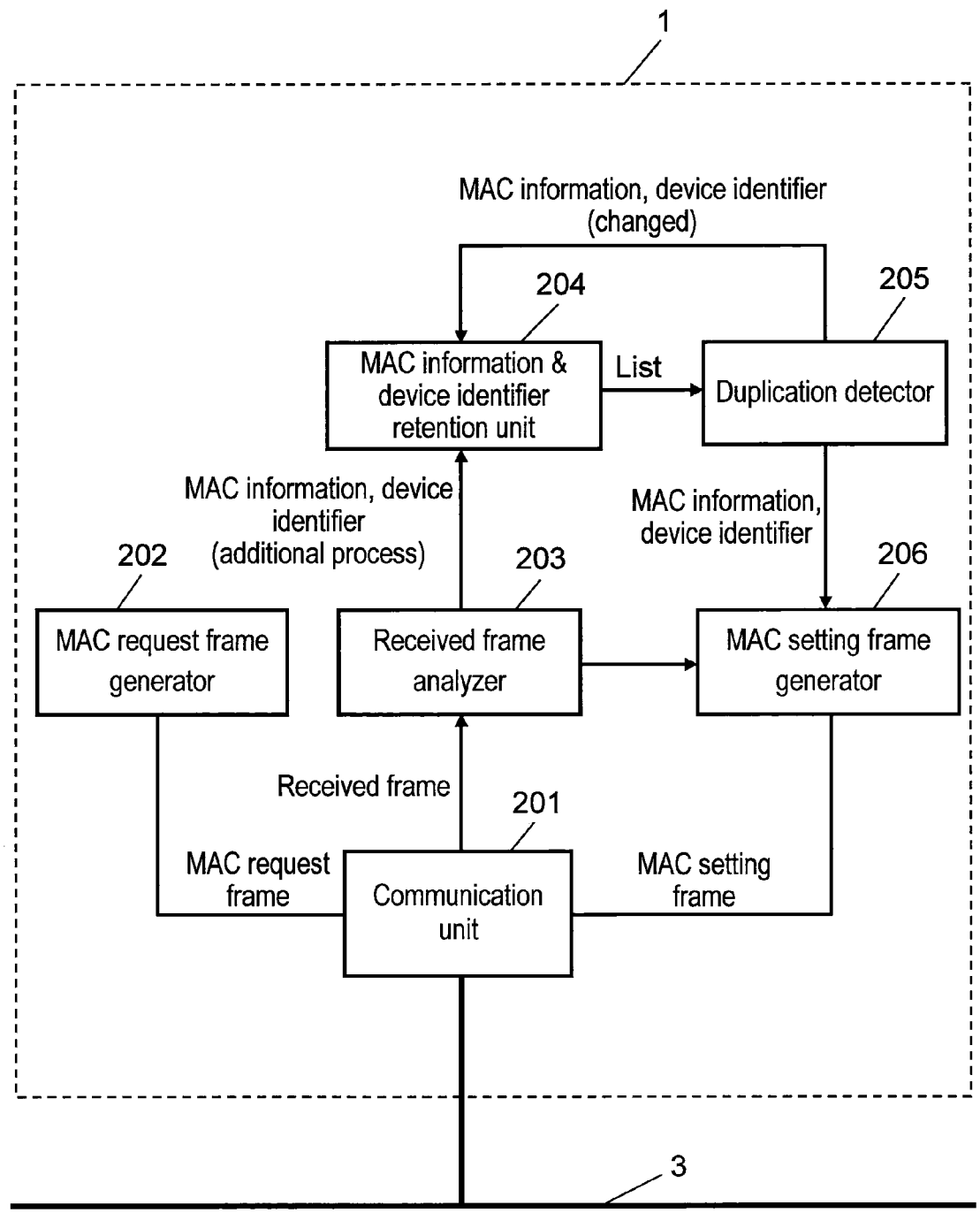
FIG. 7 is a block diagram illustrating a basic configuration of a server in accordance with the preferred embodiment.
Figure 8:
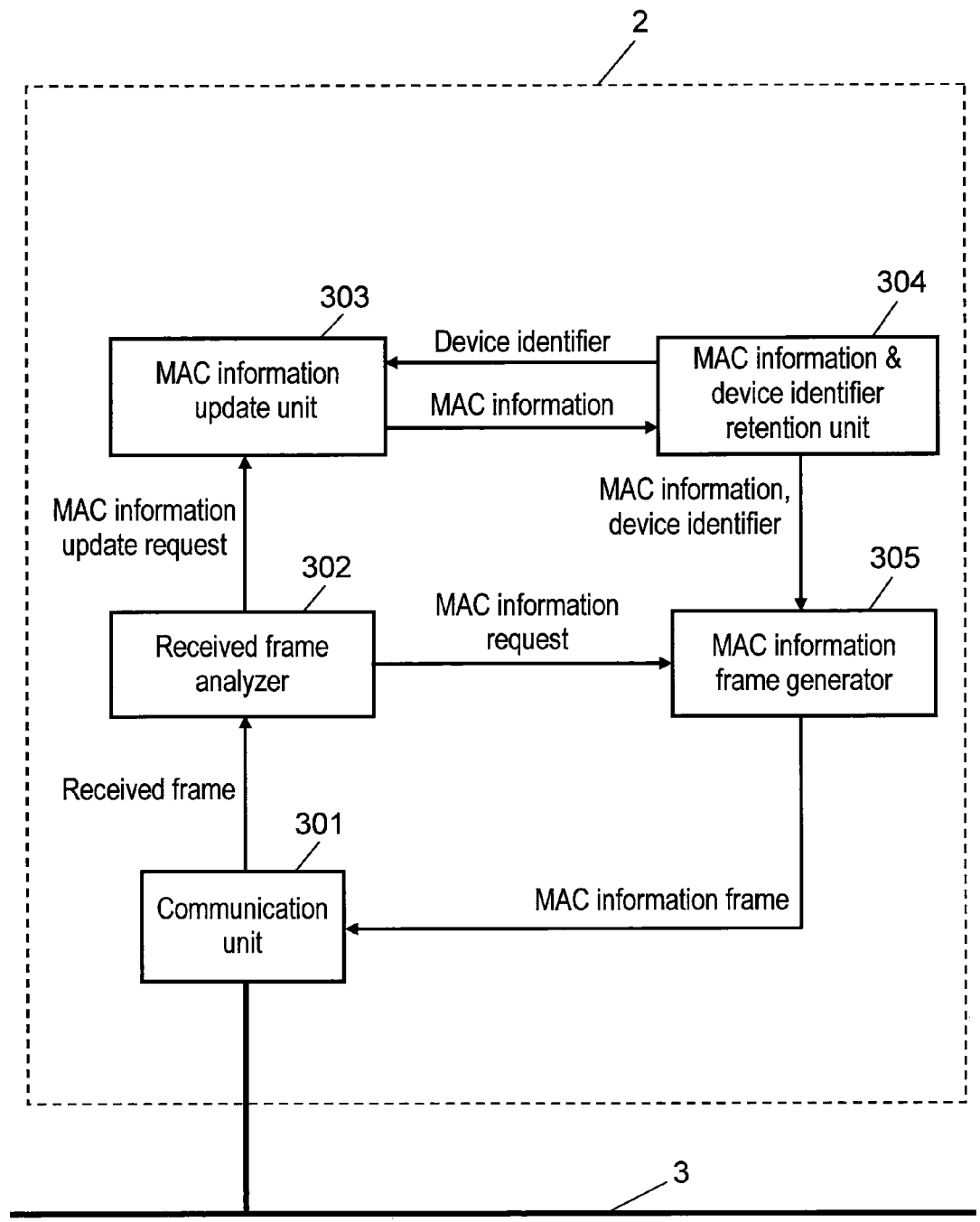
FIG. 8 is a block diagram illustrating a basic configuration of an information device (client) in accordance with the preferred embodiment.

Next, configuration of server 1 and information device (client) 2 and their operation are described with reference to FIGS. 7 and 8. FIG. 7 is a block diagram illustrating a basic configuration of server 1. FIG. 8 is a block diagram illustrating a basic configuration of information device 2.

First, the configuration and operation of server 1 are described with reference to FIG. 7. Server 1 includes communication unit 201, MAC request frame generator 202, received frame analyzer 203, MAC information & device identifier retention unit 204, duplication detector 205, and MAC setting frame generator 206. Server 1 is connected to network 3 via communication unit 201.

Communication unit 201 has a function to send and receive Ethernet® frames.

MAC request frame generator 202 generates the MAC request frame. The MAC request frame generated is sent to network 3 via communication unit 201.

Received frame analyzer 203 analyzes a frame received in communication unit 201. When communication unit 201 receives MAC information frames from information devices 2 connected to network 3, received frame analyzer 203 extracts source MAC information of the frame (information on source address) and device identifier of the information device, such as a serial number, contained in the payload, and sends them to MAC information & device identifier retention unit 204.

MAC information & device identifier retention unit 204 has a function to retain a set of MAC information and device identifier. Multiple sets of these pieces of information can be stored. Then, MAC information and device identifier of all information devices are indicated in a list. MAC information & device identifier retention unit 204 has a function to change, delete, or add each piece or each set of information in the list. To facilitate searching of the above information, MAC information & device identifier retention unit 204 may also have a function to typically list MAC information in ascending order or descending order. Still more, it may also have a high-speed search function by using a hash table. Although not illustrated, MAC information & device identifier retention unit 204 may have a function to initialize the list it retains at the same time when MAC request frame generator 202 generates the MAC request frame.

Duplication detector 205 detects duplication in MAC information based on the list retained in MAC information & device identifier retention unit 204. If information devices 2 with different device identifiers but the same MAC information are detected, duplication detector 205 determines that the MAC information is identical. If the MAC information is identical, duplication detector 205 generates MAC information that does not exist in the list, and send it, together with aforementioned device identifier, to MAC setting frame generator 206. There may be a function to update the list by sending the same information to MAC information & device identifier retention unit 204.

MAC setting frame generator 206 generates a MAC setting frame based on information sent from duplication detector 205. The MAC setting frame generated is sent to network 3 via communication unit 201.

Next, the configuration and operation of information device (client) 2 are described with reference to FIG. 8. Information device 2 includes communication unit 301, received frame analyzer 302, MAC information update unit 303, MAC information & device identifier retention unit 304, and MAC information frame generator 305. Information device 2 is connected to network 3 via communication unit 301.

Communication unit 301 has a function to send and receive Ethernet® frames. A frame received by communication unit 301 is sent to received frame analyzer 302.

The function of MAC information & device identifier retention unit 304 is described first. MAC information & device identifier retention unit 304 has a function to retain or provide its own MAC information and its own device identifier such as a serial number. In addition, MAC information & device identifier retention unit 304 has a function to change its own MAC information and retain it thereafter.

Received frame analyzer 302 analyzes a received frame. When a MAC setting frame is received, received frame analyzer 302 extracts "MAC information to be set" and device identifier, such as a serial number, stored in the payload; and sends these pieces of information to MAC information update unit 303.

MAC information update unit 303 obtains its device identifier from MAC information & device identifier retention unit 304, and compares it with device identifier obtained from received frame analyzer 302. If they are the same, "MAC information to be set" obtained from received frame analyzer 302 is sent to MAC information & device identifier retention unit 304 so as to update its own MAC information. When received frame analyzer 302 receives the MAC request frame, it sends the request to MAC information frame generator 305.

Upon receiving the request, MAC information frame generator 305 obtains its own MAC information and device identifier from MAC information & device identifier retention unit 304, and generates a MAC information frame. The MAC information frame generated is sent to network 3 via communication unit 301.

Figure 9:
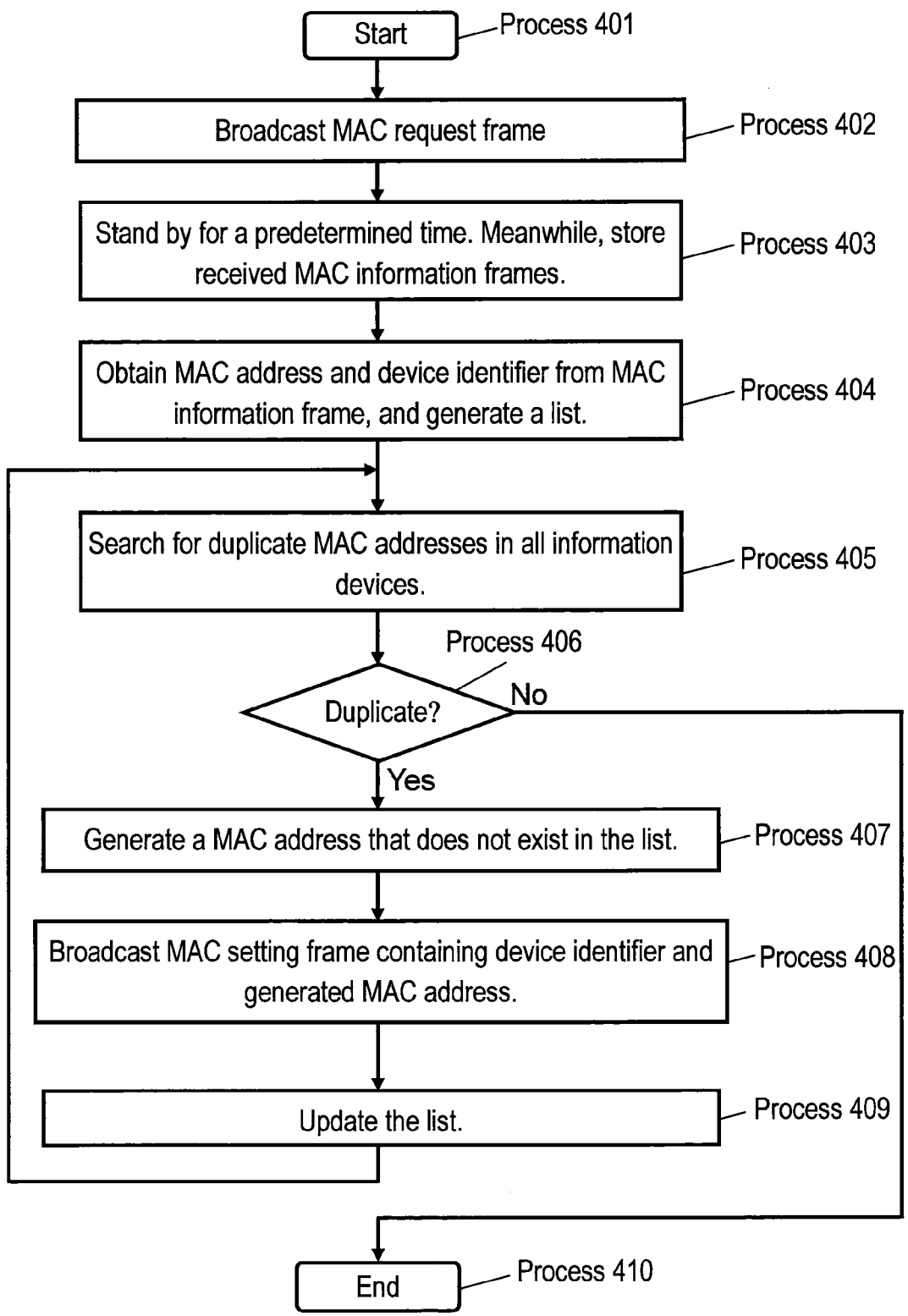
FIG. 9 is a flow chart of the operation of a server in accordance with the preferred embodiment.
Figure 10:
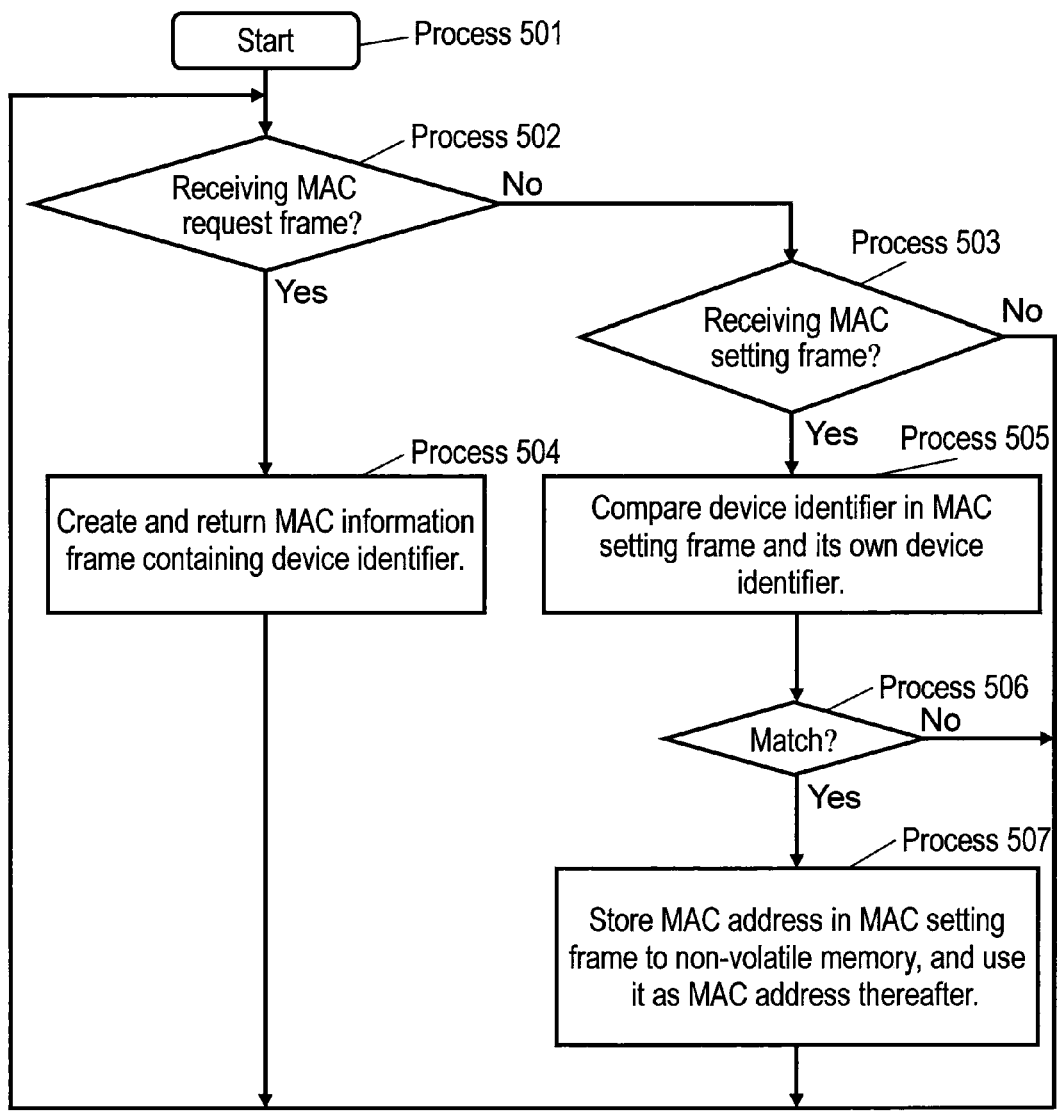
FIG. 10 is a flow chart of the operation of an information device (client) in accordance with the preferred embodiment.

Next, the operation of server 1 and information device 2 is described in details using FIGS. 9 and 10 with reference to FIGS. 3 to 6. FIG. 9 is a flow chart of the operation of server 1 in the preferred embodiment of the present invention.

In process 401, server 1 starts processing when a predetermined condition is satisfied. This predetermined condition is, for example, turning on the power; after the elapse of a predetermined time; a command from a user; or detection of an abnormality.

In process 402, server 1 first sends the MAC request frame in FIG. 4 so as to collect the MAC address of each of information devices 2 on network 3.

Next, in process 403, server 1 stands by for a predetermined time after sending the MAC request frame. During this time, server 1 stores the MAC information frames in FIG. 5 received from information devices 2. Although not illustrated in the drawing, server 1 may move to the next process at the time all MAC information frames from all information devices 2 are received if the number of information devices 2 on network 3 is identified in advance.

Next, in process 404, server 1 obtains the aforementioned device identifier of information device 2 and MAC address, which are correlated, from the MAC information frame. Here, a list or hash table may also be generated to facilitate search.

In process 405, information devices with the same MAC address are searched for in the list.

If no duplicate MAC addresses are found in process 406 ('No'), processing ends (process 410). On the other hand, if duplicate addresses are detected ('Yes'), the device identifiers of these information devices are stored (not illustrated), and the next process is executed.

In process 407, a new MAC address is generated so as to change any duplicate MAC addresses. A MAC address generated in process 404, which does not exist in the above list, is used. Server 1 may automatically generate a new MAC address at random, or from a specific range. Alternatively, a new MAC address may be designated by the user.

In process 408, a MAC setting frame in FIG. 6 is generated such that this frame includes the generated MAC address and the device identifier of the information device. The MAC setting frame is distributed to network 3 by broadcast or multicast transmission.

Next, in process 409, information in the aforementioned list is updated. The operation then returns to process 405 to detect duplicate MAC addresses using the updated list. Processes 405 to 409 are repeated until all duplicate MAC addresses are eliminated.

Although not illustrated in FIG. 2, if three information devices have the same MAC address, for example, server 1 sends the MAC setting frame (process 408) to change the MAC address of at least two devices. The operation ends when every MAC address of all information devices 2 become unique (process 410).

FIG. 10 is a flow chart of the operation of information device (client) 2 in network 3 in the preferred embodiment of the present invention.

In process 501, information device 2 starts process immediately after the power is turned on, in order to receive the MAC request frame or MAC setting frame. However, information device 2 may also start processes after detecting a specific condition, same as server 1.

In processes 502 and 503, if information device 2 receives an Ethernet® frame, information device 2 determines whether the frame is the MAC request frame (process 502) or MAC setting frame (process 503). If the frame is neither ('No' in both process 502 and process 503), information device 2 stands by until it receives the next Ethernet® frame.

If the MAC request frame is received in process 502 ('Yes'), information device 2 generates a MAC information frame in FIG. 5 that includes device identifier (content is the same as that already described), and returns it to server 1 in process 504.

In this case, if it is evident that the MAC address of server 1 is the only one in the network (unique MAC address), the source address in the MAC request frame in FIG. 4 may be used as the destination address in the MAC information frame. Alternatively, a broadcast address or multicast address may be used as the destination address. However, if there is possibility that the same MAC address as that of server 1 exists on the network, a broadcast address or multicast address is used. If whether the MAC address of server 1 is unique or not is unknown, this is determined based on the aforementioned list (List of MAC addresses and device identifiers of information devices) generated from MAC information frames collected by broadcast communication. This determination result may also be included in the MAC request frame, and sent to all information devices 2. Alternatively, the list itself may be sent to information devices 2 to share information on the list among all information devices 2 on the network. In this way, if there is three or more duplicate MAC address in network 3, a response from each of information devices to the MAC request frame sent from server 1 may be returned in unicast transmission from the second time.

If the MAC setting frame in FIG. 6 is received ('Yes') in process 503, information device 2 compares the device identifier contained in the MAC setting frame with its own device identifier in process 505.

If compared device identifiers are different ('No') in process 506, no further processes takes place. If the information in MAC setting frame and its own information match, its own MAC address is changed to a new MAC address designated in the MAC setting frame in process 507. More specifically, a memory such as EEPROM and FLASH is updated with the designated MAC address, and stored.

After this, the updated MAC address is used for communications. Reboot (restart) may be conducted as required.

As described with reference to FIG. 6, if the payload of the MAC setting frame includes multiple sets of information of device identifier and MAC address to be set, MAC addresses in applicable information devices are simultaneously changed. Accordingly, duplication of MAC addresses is resolved rapidly.

INDUSTRIAL APPLICABILITY

The present invention offers an effective method of rapidly resolving duplicate MAC addresses held by multiple information devices on a network. This method is thus broadly applicable to networked information systems.

The invention claimed is:

1. A method of resolving duplicate MAC addresses in a network configured with a server managing MAC addresses and a plurality of information devices, wherein
the server distributes a MAC request frame that requests a MAC address of each of the plurality of information devices on the network,
collects a MAC information frame returned from each of the plurality of information devices, the MAC information frame including a MAC address and a device identifier of a transmitting information device; and
if duplication of the MAC addresses in the collected MAC information frames is detected, the server distributes a MAC setting frame including the device identifiers of information devices having duplicate MAC addresses and new MAC addresses to the network so as to change MAC addresses of the information devices having the duplicate MAC addresses to the new MAC addresses.

2. The method of resolving duplicate MAC addresses of claim 1, wherein if three or more information devices have the same MAC address, the MAC setting frame includes a plurality of sets of information of the device identifier and new MAC address of the information devices having the duplicate MAC addresses.

3. The method of resolving duplicate MAC addresses of claim 1, wherein
the server generates a list that correlates the device identifier and the MAC address of each of the information devices on the network based on the MAC information frames collected, and
a MAC address not present in the list is set as the new MAC address.

4. A method of resolving MAC addresses in a network configured with a server managing MAC addresses and a plurality of information devices,
wherein
the server distributes a MAC request frame that requests a MAC address of each of the plurality of information devices on the network,
collects a MAC information frame returned from each of the plurality of information devices, the MAC information frame including a MAC address and a device identifier of a transmitting information device, and
if duplication of the MAC addresses in the collected MAC information frames is detected, the server distributes a MAC setting frame including the device identifiers of information devices having duplicate MAC addresses and new MAC addresses to the network so as to change MAC addresses of information devices having the duplicate MAC addresses to the new MAC addresses,
wherein
the server generates a list that correlates the device identifier and the MAC address of each of the information devices on the network based on the MAC information frames collected, and
a MAC address not present in the list is set as the new MAC address, and
wherein
whether or not a MAC address of the server is unique on the network is determined based on the list, and
a determination result concerning whether or not the MAC address of the server is unique on the network is sent to the information devices so that the information devices designate a destination address of the MAC information frame as the MAC address of the server if the MAC address of the server is unique.

5. The method of resolving duplicate MAC addresses of claim 1, wherein
the device identifier of each of the information devices includes at least one of a serial number of the information device, information that specifies a type of information device, a part number, and a manufacturing date code.

6. The method of resolving duplicate MAC addresses of claim 1, wherein
the server distributes the MAC request frame by one of multicast transmission or broadcast transmission.

7. A network device management system, in which a plurality of information devices and a server managing a MAC address of each of the information devices are connected to a network, for resolving duplicate MAC addresses of the information devices on the network,
the server comprising:
a MAC request frame generator for requesting the MAC address of each of the plurality of information devices;
a received frame analyzer for extracting MAC information and a device identifier from a MAC information frame received from each of the information devices;
a MAC information and device identifier retention unit for retaining a set of the MAC information and the device identifier;
a duplication detector for searching information retained in the MAC information and device identifier retention unit, and detecting duplicate MAC information; and
a MAC setting frame generator for generating a MAC setting frame based on a result detected by the duplication detector; and
the information device comprising:
a MAC information and device identifier retention unit for retaining a set of its own MAC information and a device identifier;
a received frame analyzer for extracting the MAC information and the device identifier in the MAC setting frame received from the server;
a MAC information update unit for comparing the device identifier obtained from the received frame analyzer and the device identifier obtained from the MAC information and device identifier retention unit, and updating its own MAC information with the MAC information obtained from the MAC information analyzer if the device identifiers match; and
a MAC information frame generator for obtaining the set of its own MAC information and device identifier from the MAC information and device identifier retention unit, and generating a MAC information frame.

8. A server connected to a plurality of information devices in a network, and manages MAC addresses of the information devices, the server comprising:
- a MAC request frame generator for requesting a MAC address of each of the information devices;
- a received frame analyzer for extracting MAC information and a device identifier in a MAC information frame received from each of the information devices;
- a MAC information and device identifier retention unit for retaining a set of the MAC information and the device identifier;
- a duplication detector for searching information retained in the MAC information and device identifier retention unit, and detecting duplicate MAC information; and
- a MAC setting frame generator for generating a MAC setting frame based on a result detected by the duplication detector.

9. An information device connected to a server that manages MAC address of devices on a network, the information device comprising:
- a MAC information and device identifier retention unit for retaining a set of its own MAC information and device identifier;
- a received frame analyzer for extracting MAC information and a device identifier in a MAC setting frame received from the server;
- a MAC information update unit for comparing the device identifier obtained from the received frame analyzer and the device identifier obtained from the MAC information and device identifier retention unit, and updating its own MAC information with MAC information obtained from the MAC information analyzer if the device identifiers match; and
- a MAC information frame generator for obtaining its own MAC information and device identifier from the MAC information and device identifier retention unit, and generating a MAC information frame.

10. The method of resolving duplicate MAC addresses of claim 1, wherein
the server distributes the MAC setting frame by one of multicast transmission or broadcast transmission.

11. The network device management system of claim 7, wherein
the device identifier of each of the information devices includes at least one of a serial number of the information device, information that specifies a type of information device, a part number, and a manufacturing date code.

12. The server of claim 8, wherein
the device identifier of each of the information devices includes at least one of a serial number of the information device, information that specifies a type of information device, a part number, and a manufacturing date code.

13. The information device of claim 9, wherein
the device identifier includes at least one of a serial number of the information device, information that specifies a type of information device, a part number, and a manufacturing date code.

* * * * *